(12) United States Patent
Li

(10) Patent No.: US 12,214,543 B1
(45) Date of Patent: Feb. 4, 2025

(54) AUXILIARY DEVICE FOR APPLYING PROTECTIVE FILM

(71) Applicant: Ziqiang Li, Shenzhen Guangdong (CN)

(72) Inventor: Ziqiang Li, Shenzhen Guangdong (CN)

(*) Notice: Subject to any disclaimer, the term of this patent is extended or adjusted under 35 U.S.C. 154(b) by 0 days.

(21) Appl. No.: 18/642,457

(22) Filed: Apr. 22, 2024

(51) Int. Cl.
B29C 63/22 (2006.01)
B29C 63/00 (2006.01)
B29C 63/02 (2006.01)
B29L 31/34 (2006.01)

(52) U.S. Cl.
CPC ...... *B29C 63/0004* (2013.01); *B29C 63/0047* (2013.01); *B29C 63/02* (2013.01); *B29C 63/22* (2013.01); *B29C 2063/0008* (2013.01); *B29L 2031/3437* (2013.01); *B29L 2031/3475* (2013.01)

(58) Field of Classification Search
CPC ............ B32B 37/0046; B32B 2457/20; B29C 63/0004; B29C 63/0047; B29C 63/02; B29C 63/22; B29C 2063/0008; B29L 2031/3437; B29L 2031/3475
See application file for complete search history.

(56) References Cited

U.S. PATENT DOCUMENTS 10,399,315 B2   9/2019  Patel et al.
2021/0176351 A1* 6/2021  Bulkley ............... G06F 1/1626
2021/0252770 A1* 8/2021  Lee ..................... G06F 1/1626

* cited by examiner

*Primary Examiner* — Vishal I Patel
(74) *Attorney, Agent, or Firm* — Ying-Ting Chen; Law Office of Michael Chen

(57) ABSTRACT

An auxiliary device for applying protective film, includes a film application box, one end of the film application box is provided with an accommodation cavity, two symmetrical sliding groove holes are provided on the film application box, each sliding groove hole is provided with a moving block, the front end of each moving block is fixedly installed with an installation box, the rear end of each moving block is fixedly installed with a stop block, the aforementioned accommodation cavity is fixedly installed with two limiting rings, and one side of the aforementioned film application box is provided with protective film.

7 Claims, 8 Drawing Sheets

AUXILIARY DEVICE FOR APPLYING PROTECTIVE FILM

FIELD OF THE INVENTION

The present invention relates to the field of film applying technology, specifically to an auxiliary device for applying protective film.

BACKGROUND OF THE INVENTION

At present, consumers generally apply protective film to electronic device screens (such as mobile phones, tablet computer, etc.) through auxiliary devices to protect electronic devices and prevent damage caused by accidental dropping. Many film applying devices on the market are provided in frame shaped, which only achieve fixation function with the outer frame, then place the tempered glass protective film in the outer frame to be applied on phone.

The Chinese patent (Patent No.: CN216834462U) discloses a film applying tool comprises: the tool body, a positioning structure provided on the tool body for fixing at least one of the protective film and the device; the double-sided adhesive structure is provided on the tool body, and the double-sided adhesive structure is used for bonding with the protective film; the repositionable adhesive structure detachably connected to the tool body, which is used for bonding with the protective film. The protective film is fixed in an inclined state by the combination of the repositionable adhesive structure and the double-sided adhesive structure. When applying the film, the part where the protective film is connected to the double-sided adhesive structure is adhered to the equipment firstly, the part where the protective film is connected to the repositionable adhesive structure is in a suspended state, then remove the repositionable adhesive structure, and the remaining parts of the protective film are attached to the equipment through free fall.

The above-mentioned patent can quickly apply the protective film and/or equipment through the positioning structure, improving the film application efficiency and effect of the film application tool. Although the above-mentioned positioning structure plays a positioning role, the positioning effect is poor, and equipment is prone to loose during film application. In addition, when the film is properly applied, it cannot tightly adhere to the screen and affects the quality of the film applying.

Therefore, the present invention provides an auxiliary device for applying protective film to solve the above-mentioned problems.

SUMMARY OF THE DISCLOSURE

In order to solve the above problems, the present invention provides an auxiliary device for applying protective film, which effectively solves the problems of prior arts: poor positioning effect, easy loosening of equipment during film applying, and inability to tightly adhere the film to the screen.

To achieve the above purpose, the present invention provides the following technical solutions:

An auxiliary device for applying protective film comprises the film application box, one end of the film application box is provided with the accommodation cavity, two symmetrical sliding groove holes are opened on the film application box, each sliding groove hole is provided with a moving block, the front end of each moving block is fixedly installed with an installation box, the rear end of each moving block is fixedly installed with a stop block, two limiting rings are fixedly installed inside the accommodation cavity, and one side of the film application box is provided with the protective film.

Preferably, each moving block is provided with the installation cavity, each installation box is provided with the sliding cavity connected to the installation cavity, each sliding cavity is provided with the auxiliary board, each auxiliary board is fixedly installed with a pull rod inside the installation cavity, and each pull rod is provided with springs respectively.

Preferably, rectangular holes are respectively provided at the left and right ends of the film application box, and compression blocks are installed inside each rectangular hole.

Preferably, the inner walls of the upper and lower ends of the film application box are fixedly provided with compression pieces respectively.

Preferably, each limiting ring is fixedly provided with the auxiliary ring.

Preferably, the left and right ends of the film application box are respectively provided with placing openings, and one end of each compression block is provided with a inclined surface.

Preferably, two suction cups are fixedly installed on the film application box, each of the suction cup is provided with a suction plate, and each suction plate is provided with a pulling shaft.

The beneficial effects of the present invention are:

Through the mutual cooperation between the limiting ring, auxiliary ring, and suction plate, the installation position of the film can be more precise, at the same time, the protective film on mobile phones can be more firm with the squeezing and rebound effect of the compression piece and compression block. In addition, by the auxiliary effect of pulling shaft and suction plate, the mobile phone can be quickly separated from the film application box, resulting in higher film application efficiency and less air bubbles during film application, thus improving the quality of film application.

DETAILED DESCRIPTION OF THE PREFERRED EMBODIMENTS

Figure 1:
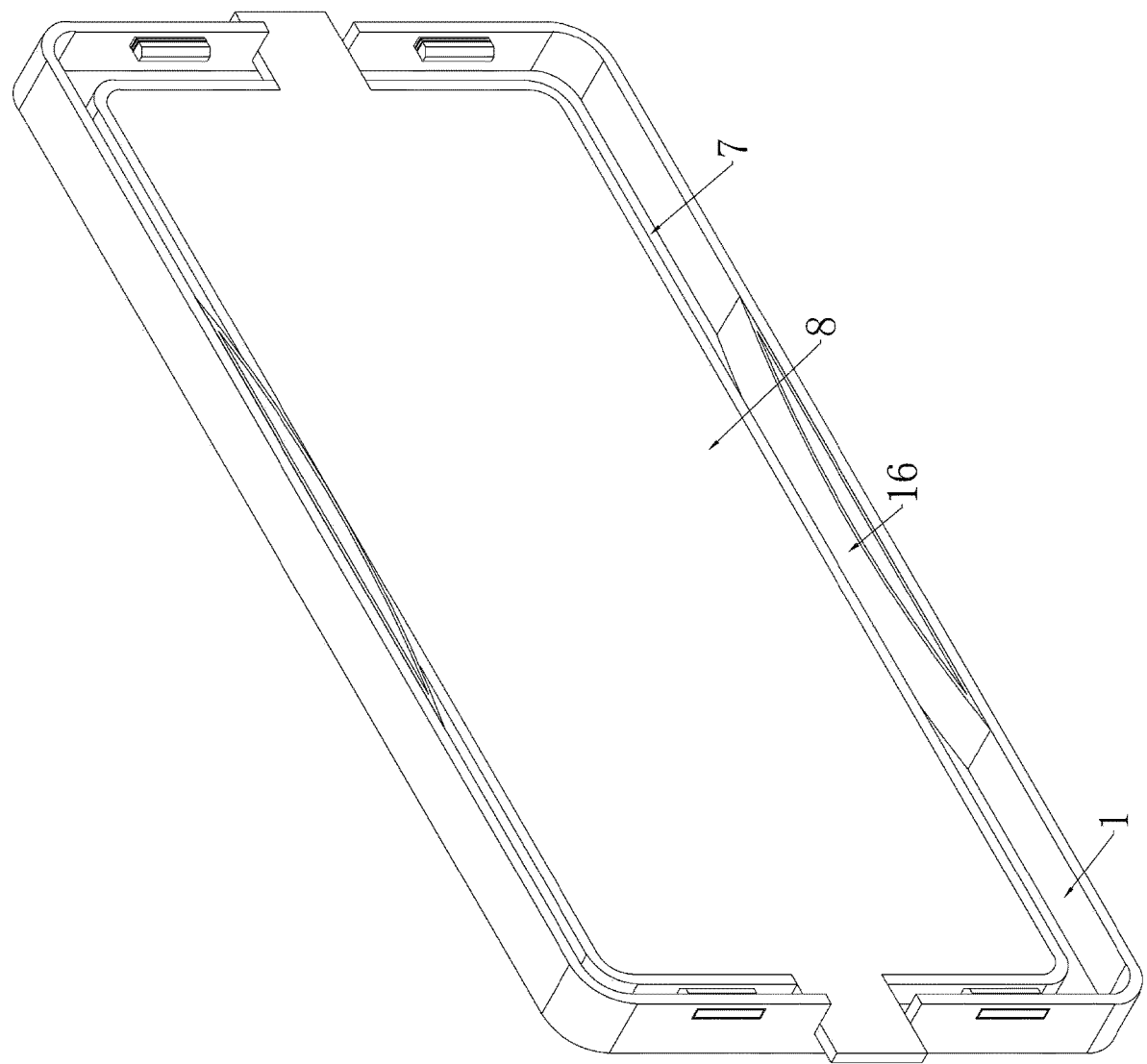
FIG. 1 is the perspective view I of the present invention.
Figure 2:
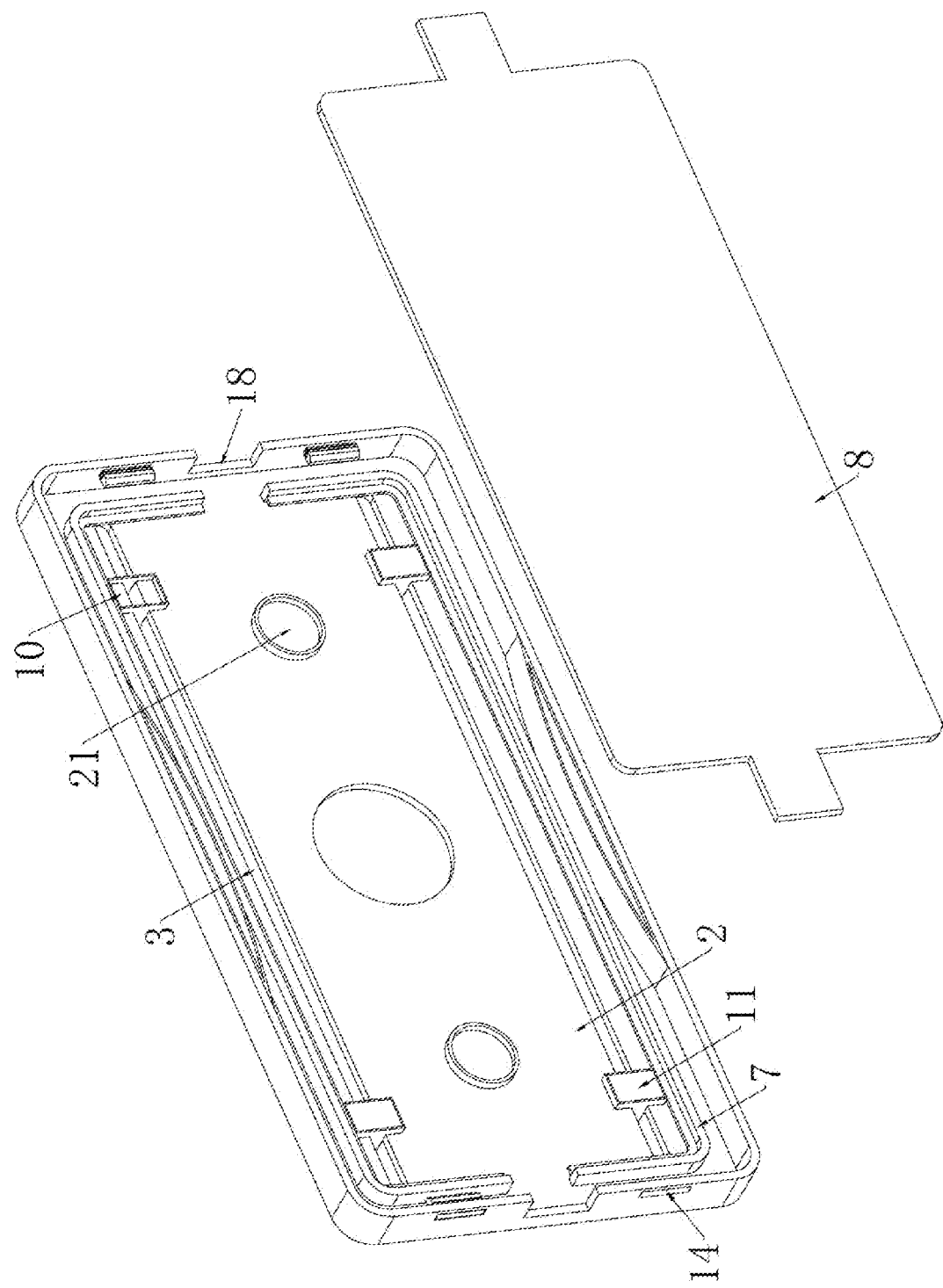
FIG. 2 is the perspective view II of the present invention.

Other features, objects and advantages of the present invention will be more clearly and completely by the detailed description of the non-limiting embodiments with reference to the attached drawings (FIG. 1 to FIG. 8). Obviously, the described embodiments are only part of the embodiments of the present invention, but not all of them. Based on the embodiments of the present invention, all other embodiments obtained by ordinary technicians in the field without creative labor are within the scope of the present invention.

As shown in FIGS. 1-8, an auxiliary device for applying protective film comprises the film application box 1, which can be in the shape of rectangular or square, there are no restrictions on the shape in order to meet the needs of various devices; the front end of the film application box 1 is provided with the accommodation cavity 2, which provides space for film application; the back end of the film application box 1 is provided with two symmetrical horizontal sliding groove holes 3, two sliding groove holes 3 are symmetrically arranged up and down, each sliding groove hole 3 is provided with a moving block 4 that slides left and right, the moving block 4 can freely slide along the sliding groove hole 3; the front end of each moving block 4 is fixedly installed with an installation box 5, and each installation box 5 is provided in the accommodation cavity 2 and can slide freely inside the accommodation cavity 2; the rear end of each moving block 4 is fixedly installed with a stop block 6, each stop block 6 is slidably installed on the rear wall of the film application box 1, the stop block 6 can prevent the moving block 4 from falling off the sliding groove hole 3; two limiting rings 7 are fixedly provided inside the accommodation cavity 2, which are fixedly connected to the film application box 1, the two limiting rings 7 are symmetrically arranged with each other, the positioning opening is provided between the ends of the two limiting rings 7; the protective film 8 is provided on one side of the film application box 1, which is a tempered film, the inner diameter between the two limiting rings 7 is the same as the outer diameter of the protective film 8, making it easy to place the film protective 8 between the two limiting rings 7; the rear end of the protective film 8 is provided with the protective tape to prevent damage to the protective film 8, the left and right ends of the protective tape are respectively provided with sealing strips.

Figure 8:
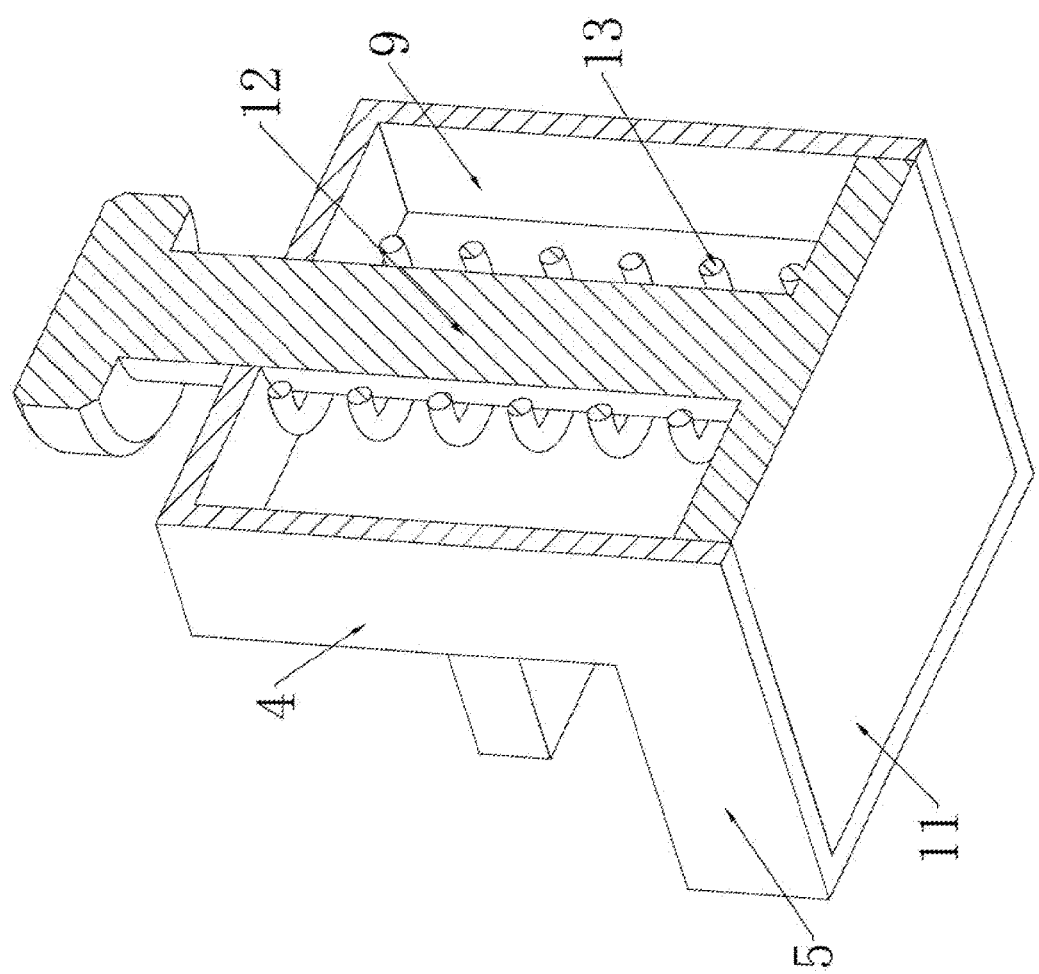
FIG. 8 is the section schematic view of the moving block.

As shown in FIG. 8, each moving block 4 is provided with the installation cavity 9, the rear end of each moving block 4 is provided with the limiting hole connected to the installation cavity 9; each installation box 5 is provided with the rectangular sliding cavity 10 connected to the installation cavity 9; each sliding cavity 10 is provided with the auxiliary board 11 that slides forward and backward, the front end of the auxiliary board 11 is made of rubber material, which will not create scratches the protective film 8; the auxiliary board 11 can freely slide back and forth in the sliding cavity 10, each auxiliary board 11 is fixedly installed with a pull rod 12 in the installation cavity 9, the rear end of each pull rod 12 slides in the limiting hole, and each pull rod 12 is provided with springs 13; one end of each spring 13 is fixedly connected to the auxiliary board 11, the other end is fixedly connected to the rear wall of the installation cavity 9, the spring 13 can be provided as existing suitable plastic or metal spring.

As shown in FIGS. 1-8, rectangular holes 14 are respectively opened at the upper and lower ends on the left side and on the right side of the film applying box 1 respectively; the rectangular holes 14 are connected to the accommodation cavity 2, and compression blocks 15 are installed inside each rectangular hole 14, the compression block 15 has the characteristics of compression and automatic reset.

Figure 4:
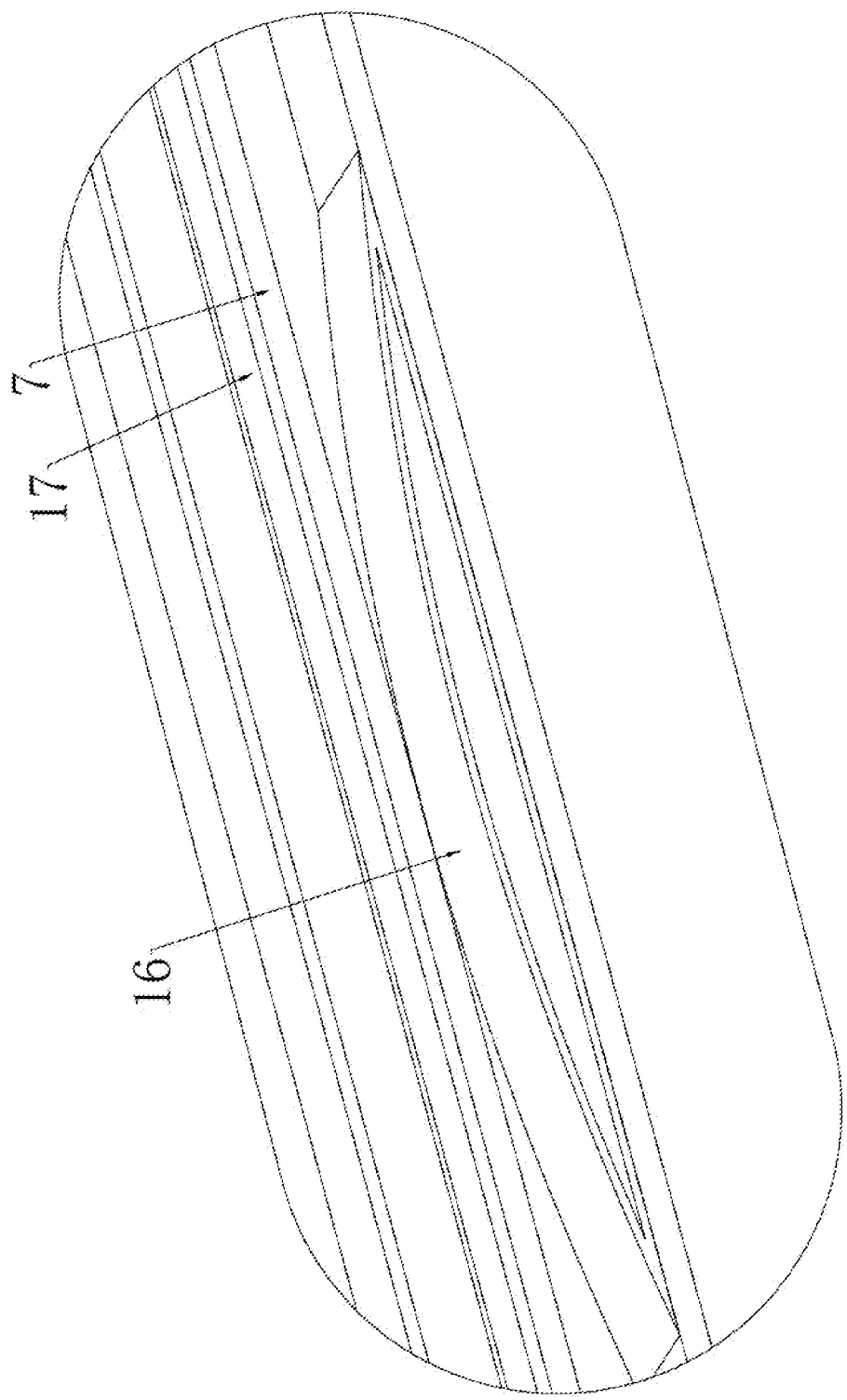
FIG. 4 is the enlarged schematic view of point A in FIG. 3.

As shown in FIG. 4, the inner walls of the upper and lower ends of the film application box 1 are fixedly provided with compression pieces 16. When the compression pieces 16 are compressed, they have the characteristic of deformation.

Figure 3:
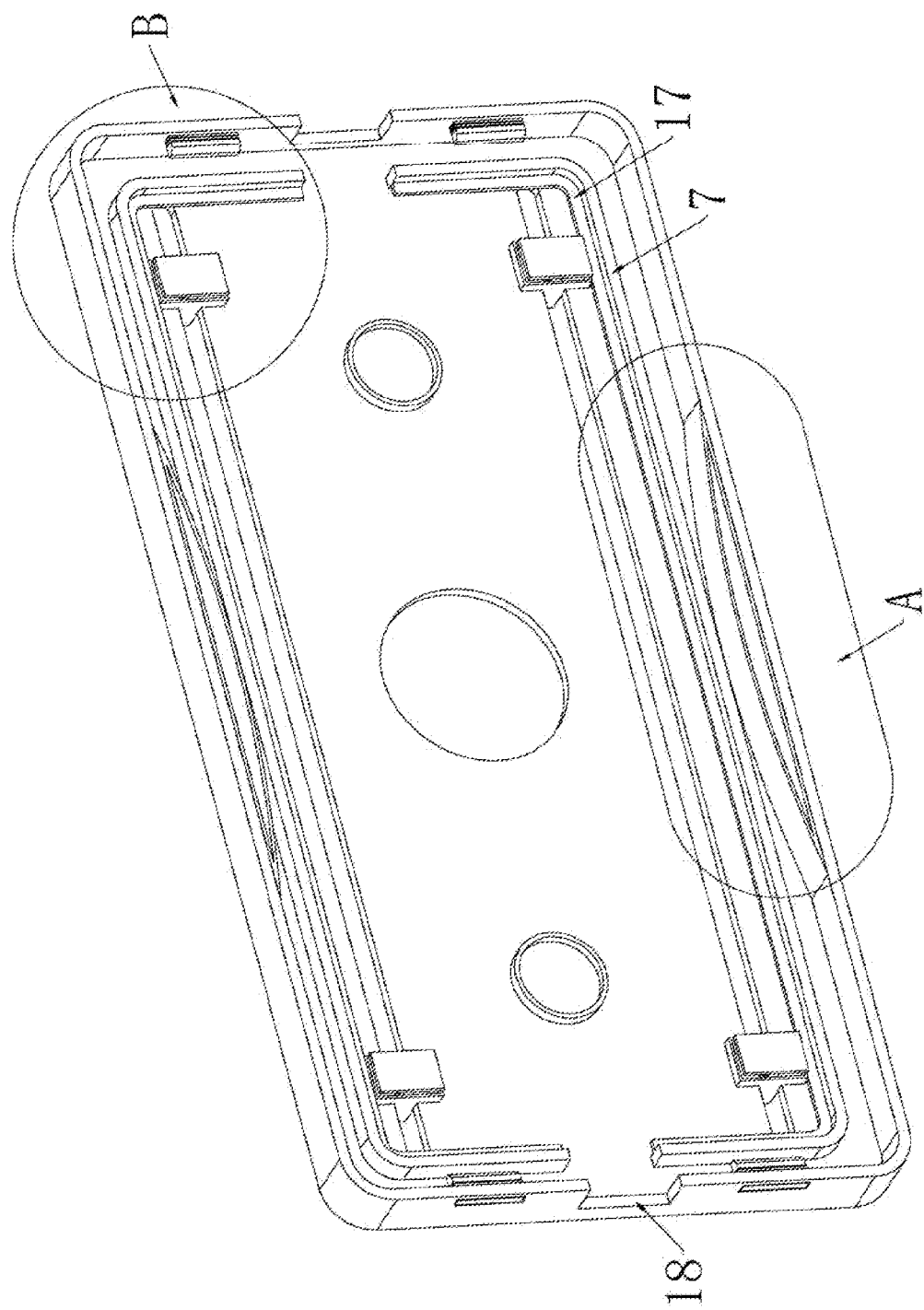
FIG. 3 is the schematic view of the installation position of the limiting ring.

As shown in FIG. 3, auxiliary rings 17 are fixedly installed on the inner wall of each limiting ring 7, a certain distance is reserved between the front end of each auxiliary ring 17 and the corresponding limiting ring 7, and the depth of the distance is the same as the thickness of the protective film 8.

Figure 5:
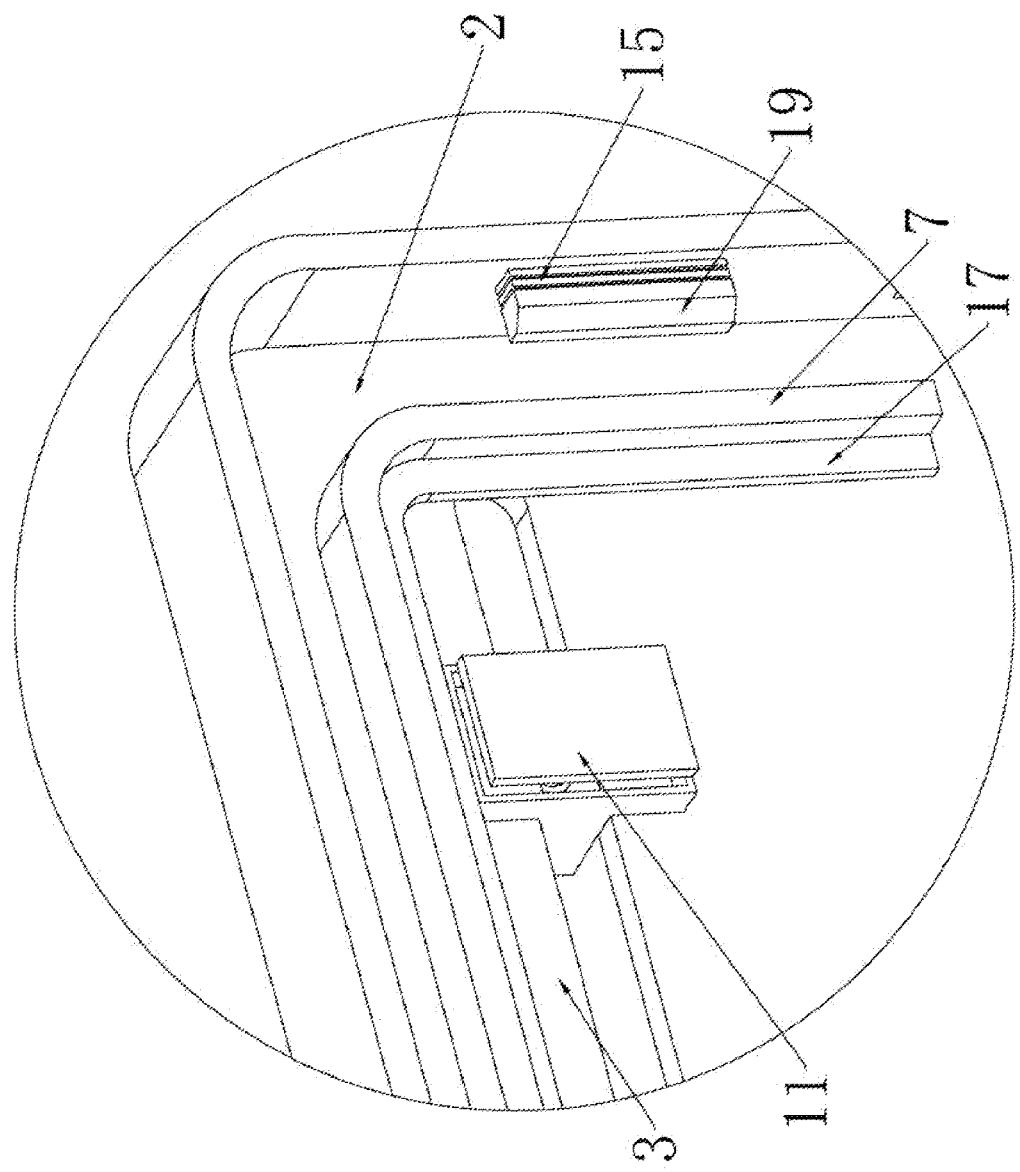
FIG. 5 is the enlarged schematic view of point B in FIG. 3.
Figure 6:
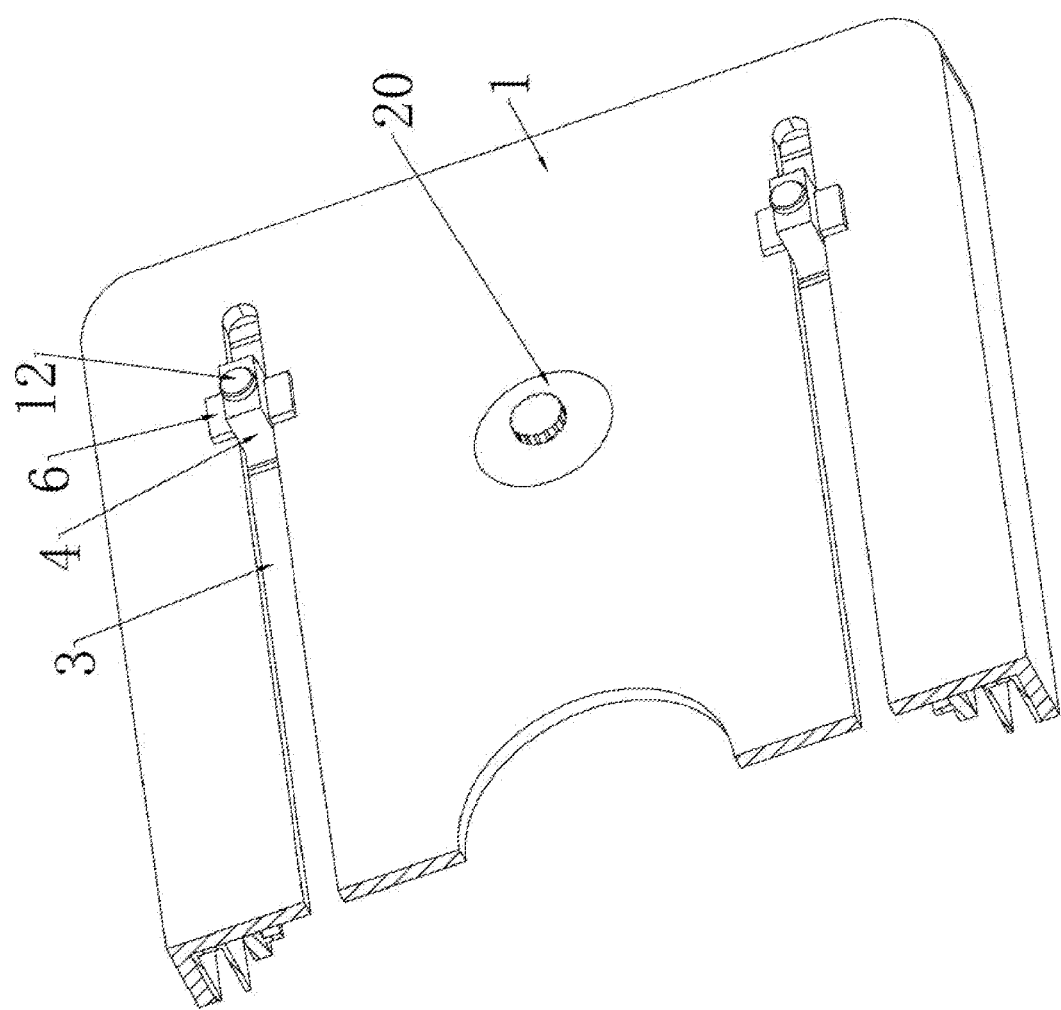
FIG. 6 is the installation schematic view of the moving block.

As shown in FIGS. 3 and 5, the left and right ends of the film application box 1 are respectively provided with placing opening 18, the size of the placing opening 18 is the same as that of the positioning opening, and the size of the sealing strip is smaller than that of the placing opening 18; one end of each compression block 15 is provided with a inclined surface 19 respectively.

Figure 7:
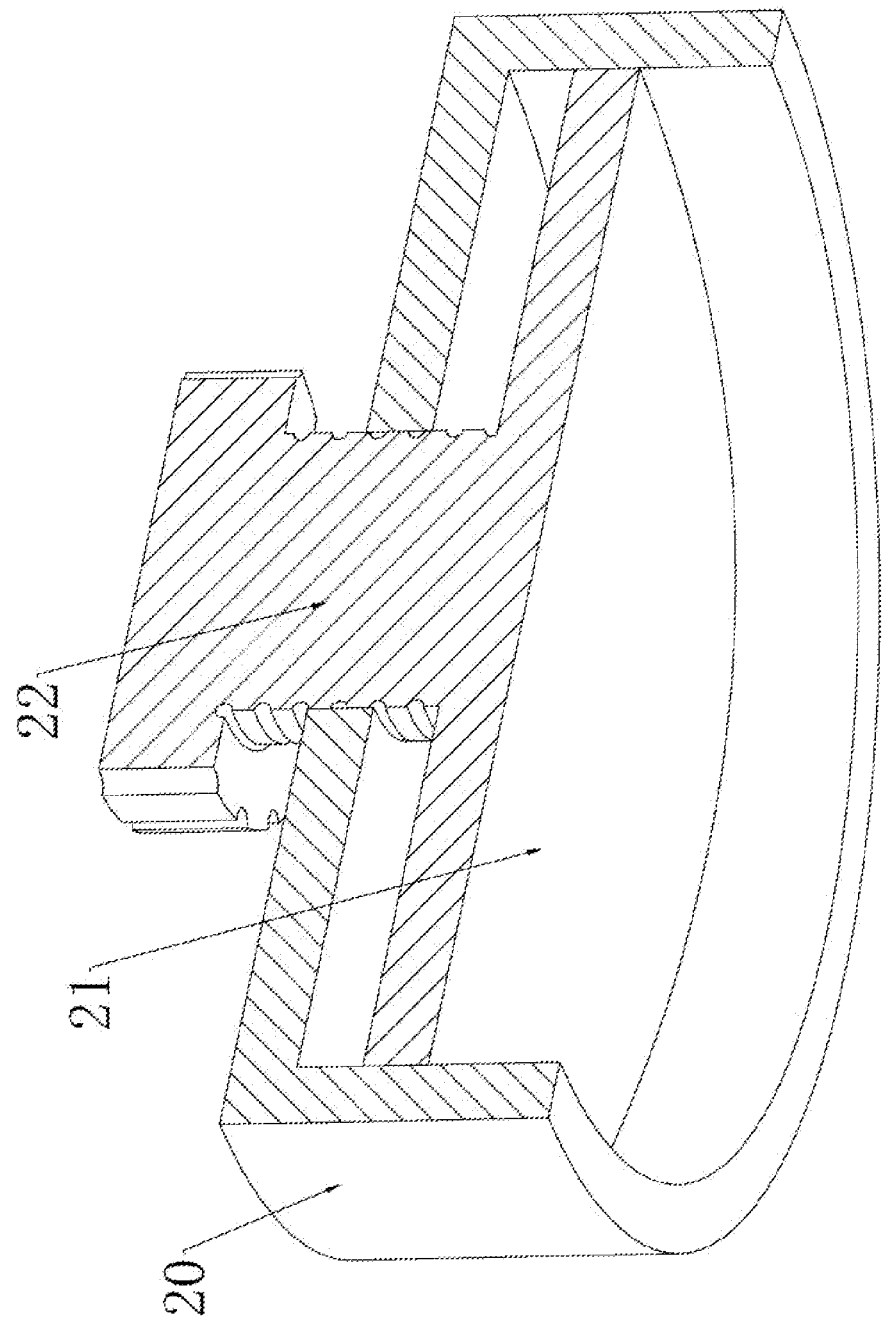
FIG. 7 is the section schematic view of the suction cup.

As shown in FIG. 7, an auxiliary circular hole is provided in the middle of the film application box 1, and installation opening are provided on the left and right sides of the auxiliary circular hole on the film application box 1, rubber suction cups 20 are fixedly installed in each installation opening, and suction cup cavities are respectively provided at the front end of each suction cup 20; each suction cup cavity is slidably installed with a suction plate 21, and each suction plate 21 is rotatably installed with a pulling shaft 22, each pull shaft 22 is threaded installed on the rear end of the corresponding suction cup 20.

The working principle of the present invention:

Specifically, during use, firstly clean the phone screen and the protective film 8, then adjust the four moving blocks 4 to the appropriate positions, hold the protective film 8 and place it between the two limiting rings 7, so that the rear end of the protective film 8 is completely in contact with the front end of the auxiliary ring 17 and the front end of the suction plate 21; the two sealing strips are located in the positioning opening and placing opening 18, then rotate the two pulling shafts 22, the pulling shaft 22 gradually moves backward as it rotates, two suction plates 21 move backward along the suction cup cavity, forming a negative pressure between the two suction plates 21 and the protective film 8, thereby sucking the film 8; manually remove the sealing strip and remove the protective tape, hold the film application box 1 and approach the phone screen. After that, press the lower end of the phone against the lower compression piece 16, the compression piece 16 will be compressed and deform towards the film application box 1, then press the upper compression piece 16 by hand, which will compress and deform towards the film application box 1 until the upper and lower ends of the phone are located between the two compression pieces 16. At this point, the two compression pieces 16 can be rebounded and clamp the phone, making it more stable.

Gradually bring the film application box 1 closer to the phone screen, at this time, the left and right ends of the phone are synchronously pressed and in contact with the inclined surface 19; as the film application box 1 continuously approaches the phone, the corresponding compression blocks 15 are pressed on the left and right ends of the phone, and multiple compression blocks 15 are rebounded to clamp the phone until the phone screen contacts the front end of the protective film 8; after the film application box 1 is completely installed with the phone, press the back end of the protective film 8 by hand through the auxiliary circular hole, in order to make the middle of the protective film 8 adhered on the phone screen, preventing bubbles from appearing during the applying process, then make each moving block 4 slide freely along the corresponding sliding groove hole 3, each auxiliary board 11 can slide and press the protective film 8 while moving, making it tightly applied with the phone screen and preventing the appearance of bubbles.

After completing the film application on the phone, rotate the two pulling shafts 22 in reverse, at this time, the two suction plates 21 move forward until the two suction cups 20 no longer sucked with the film application 8, then slowly remove the phone from the film application box 1. When it is difficult to remove the phone from the film application box 1, push each pulling rod 12 forward, the spring 13 is stretched, the auxiliary board 11 applies force to the phone screen, allowing the phone to separate from the film application box 1 quickly. In this way, each component gradually returns to original state and wait for the next use. This not only makes the phone film more tightly, but also less prone to make bubbles, making the film application more stable and efficient.

In the present invention, the use of orientation words such as "upper", "lower", "inside", "outside" are only for the convenience of description, rather than indicating or implying the specific orientation, therefore it should not be construed as being limited to the description of the following embodiments. In addition, it should be noted that the terms "first", "second" and the like in the description and claims of the present invention and the above drawings are used to distinguish similar objects, which are not necessarily used to describe the specific order or sequence. It is to be understood that the data so used are interchangeable under appropriate circumstances in order to describe the embodiments of the invention herein.

Unless otherwise stated, it should be noted that the terms "provided" and "connected" should be understood broadly. For example, "connected" could be fixed connection, detachable connection, integral connection, mechanical connection, electrical connection, direct connection, indirect connection through the intermediate structure, or internal connection between two elements. For those of ordinary skill in this field, the specific meanings of the above terms in the present invention can be understood in specific situations.

In the present invention, the terms "comprises/including" and the like in the description and claims of the present invention and the attached drawings are used to describe the technical features, numerical values, steps or components. One or more other features, numerical values, steps, components or their combinations based on this invention shall be included in the scope of protection of the present invention.

Hereinafter, embodiments of the present invention has been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. An auxiliary device for applying a protective film comprising a film application box (1), one end of the film application box (1) is provided with an accommodation cavity (2), two symmetrical sliding groove holes (3) are opened on the film application box (1), each sliding groove hole (3) is provided with a moving block (4), a front end of each moving block (4) is fixedly installed with an installation box (5), a rear end of each moving block (4) is fixedly installed with a stop block (6), two limiting rings (7) are fixedly installed inside the accommodation cavity (2), and one side of the film application box (1) is provided with the protective film (8).

2. The auxiliary device for applying the protective film according to claim 1, wherein each of said moving block (4) is provided with an installation cavity (9), each of said installation box (5) is provided with a sliding cavity (10) connected to the installation cavity (9), each of said sliding cavity (10) is provided with an auxiliary board (11), each of said auxiliary board (11) is fixedly installed with a pull rod (12) inside the installation cavity (9), and each of said pull rod (12) is provided springs (13) respectively.

3. The auxiliary device for applying the protective film according to claim 1, wherein rectangular holes (14) are respectively provided at a left end and a right end of the film application box (1), and compression blocks (15) are installed inside each rectangular hole (14).

4. The auxiliary device for applying the protective film according to claim 3, wherein inner walls of an upper and a lower end of the film application box (1) are fixedly provided with compression pieces (16) respectively.

5. The auxiliary device for applying the protective film according to claim 1, wherein each limiting ring (7) is fixedly provided with a auxiliary ring (17).

6. The auxiliary device for applying the protective film according to claim 3, wherein left and right ends of the film application box (1) are respectively provided with placing openings (18), and one end of each compression block (15) is provided with a inclined surface (19).

7. The auxiliary device for applying the protective film according to claim 1, wherein two suction cups (20) are fixedly installed on the film application box (1), each of the suction cup (20) is provided with a suction plate (21), and each suction plate (21) is provided with a pulling shaft (22).

* * * * *